United States Patent
Brewington et al.

(10) Patent No.: US 8,854,686 B2
(45) Date of Patent: Oct. 7, 2014

(54) DIGITAL PRINTING SYSTEMS FOR PACKAGING AND DOCUMENT PRINTING WITH SPECIAL COLORS

(75) Inventors: Grace T. Brewington, Fairport, NY (US); John F. Knapp, Fairport, NY (US); Nancy Y. Jia, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1057 days.

(21) Appl. No.: 12/372,074

(22) Filed: Feb. 17, 2009

(65) Prior Publication Data
US 2010/0208278 A1    Aug. 19, 2010

(51) Int. Cl.
  *G06F 15/00*    (2006.01)
  *H04N 1/40*    (2006.01)
  *G06K 7/00*    (2006.01)

(52) U.S. Cl.
  USPC ........... 358/1.9; 358/3.24; 382/312; 347/102; 271/225

(58) Field of Classification Search
  None
  See application file for complete search history.

(56) References Cited

U.S. PATENT DOCUMENTS

| | | | | |
|---|---|---|---|---|
| 5,347,353 A * | 9/1994 | Fletcher | | 399/299 |
| 5,486,057 A * | 1/1996 | Skinner et al. | | 400/120.02 |
| 5,611,629 A * | 3/1997 | Paranjpe | | 400/82 |
| 6,965,746 B2 | 11/2005 | Hays et al. | | |
| 2006/0188301 A1* | 8/2006 | Ng et al. | | 399/341 |
| 2009/0033995 A1* | 2/2009 | Puri | | 358/1.15 |

* cited by examiner

*Primary Examiner* — Douglas Tran
*Assistant Examiner* — Justin Katzwhite
(74) *Attorney, Agent, or Firm* — Oliff PLC

(57) ABSTRACT

A printing apparatus or printing system that uses multiple print engines to form an image on a substrate. The printing apparatus or printing system may be a surface printing system or a reverse printing system. Each of the multiple print engines has at least one color station. The color stations are arranged in the print engines and between the multiple print engines based on whether the printing system is a surface printing system or a reverse printing system to control the order in which colorant is formed on a substrate. Multiple print engines allow for, among other things, a greater color gamut and therefore assists in expansion of the standard color gamut.

20 Claims, 18 Drawing Sheets

SUBSTRATE
FIG. 4A
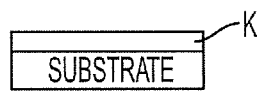
FIG. 4B
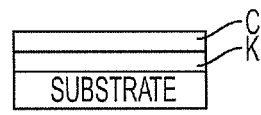
FIG. 4C

SUBSTRATE
FIG. 5A
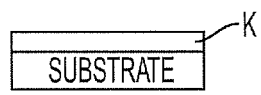
FIG. 5B
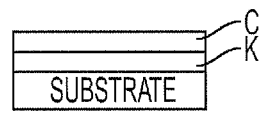
FIG. 5C

DIGITAL PRINTING SYSTEMS FOR PACKAGING AND DOCUMENT PRINTING WITH SPECIAL COLORS

BACKGROUND

The embodiments generally relate to print apparatuses and print systems that incorporate multiple print engines for printing on different mediums including, for example, flexible packaging, labels and documents.

Flexible packaging is often printed on flexography presses that may have five to eight color stations. In general, the major components used in a conventional flexography process include an ink pan, an anilox roll, a plate cylinder, and impression cylinder. In operation, cells in the anilox roll receive ink from the ink pan. The plate cylinder has raised images, or dots, that enter the anilox cells and pick up the ink that comes into contact with the image areas. The image printed on the substrate is pulled through a series of stations, or print units. Each print unit prints a single color. Various tones and shadings are achieved by overlaying the four basic shades of ink: magenta, yellow, cyan, and black (MYCK).

The flexography process is often used for print jobs associated with drink packages, snack food packages, labels, adhesive tapes, envelopes, disposable containers, corrugated containers, etc. Such print jobs often utilize multiple print stations for spot colors, brand colors, or to match the anilox roll cell count to the type of image being printed. As a result, print systems using flexography may use different color stations for the black printing which prints a black solid area on the package, and a different color station with a finer cell count anilox roll for the black station that prints half-toned areas.

A spot color is any color generated by an ink (pure or mixed) that is printed using a single run. However, use of the term spot color is commonly understood to mean any color generated by a non-standard offset ink; such as metallic, fluorescent, spot varnish, or custom hand-mixed inks. Spot colors are used in the printing industry to extend the color gamut of a printing system beyond the color gamut available with the standard process colors, magenta, cyan, yellow and black. Spot colors may also be used to provide an overcoat such as a matte finish, a gloss finish, or a satin finish. Moreover, spot colors may be used to provide white image layers.

Printing systems may print on a substrate having a finite size (i.e., an 8.5"×11" sheet of paper, an 8.5"×14" sheet of paper, an 11"×17" sheet of paper, etc.). Such printing systems are known as cut-sheet systems. Alternatively, printing systems may print on a continuous substrate in which the continuous substrate is set out from an unwinder and passed through a print engine. Upon passing through the print engine, the continuous substrate is wound up on a rewinder. Such a printing system is often referred to as a web system.

There are generally two types of printing—surface printing and reverse printing. The printing of packaging or labels may be accomplished by either surface printing or by reverse printing. Surface printing corresponds to the printing of print jobs for which the image will be viewed from the same side of the substrate on which the image is being applied (i.e., the ink or image is between the viewer and the substrate). Contrarily, reverse printing corresponds to the printing of print jobs for which the image will be viewed from a side of the substrate which is opposite to the side of the substrate on which the image is applied (i.e., the substrate is between the viewer and the ink). Document printing is generally accomplished by surface printing.

SUMMARY

With the evolution of digital print systems, there has been an increased need for expanding a printing system's color gamut. Thus, while conventional print systems may use a single print engine, embodiments for achieving this end include incorporating multiple print engines into a print apparatus or print system. For example, in an exemplary embodiment, a print system may include the following key components: a roll unwinder, two or more print engines, a fix/dry/cure station, and a roll winder.

The print engines may correspond to Image-on-Image engines. For Image-on-Image print engines, a multi-color image is built on a photoreceptor, and is then transferred to a substrate in a single transfer. The photoreceptor may be a belt or a drum. Improved productivity for a range of image lengths can be obtained with a seamless belt or imageable photoreceptor belt. Each of the print engines may include any number of color stations. Additional colors may correspond to: (i) a spot color (e.g., a Pantone color, white, clear (matte, gloss, or satin), etc.); (ii) a color used to extend the color gamut over standard 4 color printing; and/or (iii) a color used to achieve reduced image graininess (e.g., light cyan, light magenta, gray, etc.).

In some embodiments, the standard MYCK print colors are used in a first print engine (hereinafter Print Engine 1). After the MYCK image is built upon on a photoreceptor in Print Engine 1, the MYCK image is transferred onto a substrate in a single transfer. The substrate is then passed into a second print engine (hereinafter Print Engine 2). Print Engine 2 builds up an image corresponding to the additional colors (e.g., the 5678 image, where 5678 corresponds to additional color 5, additional color 6, additional color 7, additional color 8) and transfers the 5678 image onto the substrate in a single transfer on top of the MYCK image.

In some embodiments, it may be desirable to maintain color-to-color registration, independent of whether the color is imaged in Print Engine 1 or in Print Engine 2. For example, some embodiments may pass the substrate to Print Engine 2 (or any other Print Engine subsequent to Print Engine 1) after it exits Print Engine 1, and the image on the substrate may be unfixed or partially set or fully fixed before entering Print Engine 2 (or any other Print Engine subsequent to Print Engine 1). In such embodiments, the images exiting from Print Engine 2 (or any other Print Engine subsequent to Print Engine 1) are passed through a fix/dry/cure station.

In some embodiments, the color ordering may be flexible. For example, some embodiments may dispose a MYCK Print Engine subsequent to one or more other Print Engines with additional colors. In addition, some embodiments may include a subset of MYCK colors in a Print Engine (e.g., rather than having a single print engine for all MYCK colors). Thus, for example, colors 5678 could be disposed in Print Engine 1, and the MYCK colors may be disposed in Print Engine 2; or, some of the additional colors may be disposed in Print Engine 1, and some of the MYCK colors may be disposed in Print Engine 2—for example colors corresponding to magenta, yellow, and additional colors 5 and 6 may be disposed in Print Engine 1, and colors corresponding to cyan, black, and additional colors 7 and 8 may be disposed in Print Engine 2.

In some embodiments, a white layer may be formed in a Print Engine. In embodiments corresponding to Image-on-Image printing, and including multiple Print Engines, the white may be installed as the last active color station in Print Engine 1. This ensures that a white layer is formed as the first layer on the substrate for surface printing. An example of a color order for such an embodiment may be MYCW in Print Engine 1 and 567K in Print Engine 2 (where 567 corresponds to additional color 5, additional color 6, and additional color 7).

It may be difficult to image sufficiently through an image formed in black (K), particularly with typical laser wavelength exposure. Accordingly, in some embodiments, the color station corresponding to black (K) may be the last active station of the Print Engine in which the black station is disposed.

Some embodiments may utilize Image-on-Image reverse printing. Reverse printing is utilized in print jobs for which it is desirable to view the image from the side of the substrate that opposes the side on which colors are printed. In embodiments corresponding to reverse printing, the white layer is typically the last layer to be deposited on the substrate, or it otherwise represents the imaged layer farthest from the substrate. The white layer may be formed in a Print Engine. Embodiments may include white within the last Print Engine. For example, in embodiments having two Print Engines, to form the white layer as the last layer on the substrate for reverse printing, the white may be installed as a color station in the second Print Engine (i.e., Print Engine 2).

With typical laser wavelength exposure, it is extremely difficult to image sufficiently through a W image (e.g., a white image). Thus, print jobs for which white is to be used as a flood coating, embodiments may have W as the last active station in the Print Engine in which it is located. However, if white is digitally selectively imaged, the constraint of having W as the last active station in the Print Engine does not necessarily hold, depending on the desired visual appearance.

Embodiments may also include tandem engine printing. For typical tandem engines, the image is transferred from the photoreceptors to an ITB (intermediate transfer belt) one color at a time, and colors are thereafter transferred to the substrate in a second transfer step. The photoreceptors may be a drum or a belt. Improved productivity may be obtained with seamless photoreceptor and/or intermediate transfer belts or imageable seam photoreceptor and/or intermediate transfer belts. Embodiments may include an intermediate transfer drum as an alternative to an intermediate transfer belt. The tandem Print Engine may include any number of color stations.

For example, in embodiments where the tandem Print Engine includes 6 colors, the YMCK56 image is built upon the intermediate belt in Print Engine 1 and is transferred onto the substrate in a single transfer. The substrate is then passed into Print Engine 2. The 789 10 11 12 image is built upon the intermediate belt in Print Engine 2, and the 789 10 11 12 image is transferred onto the substrate in a single transfer on top of the YMCK56 image. In some embodiments, it may be desirable to maintain color-to-color registration, independent of whether the color is imaged in Print Engine 1 or in Print Engine 2.

Some embodiments may pass the substrate to Print Engine 2 (or any other Print Engine subsequent to Print Engine 1) after exiting Print Engine 1, and the image on the substrate may be unfixed or partially set before entering Print Engine 2 (or any other Print Engine subsequent to Print Engine 1). In such embodiments, the images exiting from Print Engine 2 (or any other Print Engine subsequent to Print Engine 1) are passed through a fix/dry/cure station. As discussed above, the color ordering may be flexible. For example, some embodiments may dispose a MYCK Print Engine subsequent to one or more other Print Engines with additional colors. In addition, some embodiments may include a subset of MYCK colors in a Print Engine. Thus, for example, colors 5678 could be disposed in Print Engine 1, and the MYCK colors may be disposed in Print Engine 2; or, some of the additional colors may be disposed in Print Engine 1, and some of the MYCK colors may be disposed in Print Engine 2.

A white image may be imaged by including a white color station in one of the Print Engines. In embodiments where it is desired to form a white layer as the first layer on the substrate for surface printing, a white color station may be installed as the last active color station in Print Engine 1. For example, a color order for such an embodiment may be: colors corresponding to YMCK5W disposed in Print Engine 1, and colors 789 10 11 12 disposed in Print Engine 2.

Some embodiments may include a tandem Print Engine for reverse printing. In such embodiments, the white layer is typically the last layer to be deposited on the substrate, or it otherwise represents the layer farthest from the substrate. A white image may be imaged by including a white color station in one of the Print Engines. In embodiments where it is desired to form a white layer as the last layer on the substrate for reverse printing, a white color station may be installed as a color station in Print Engine 2. For example, a color order for such an embodiment may be: YMCK56 in Print Engine 1, and W89 10 11 12 in Print Engine 2. If white is digitally selectively imaged, the constraint of having W as the first active station in Print Engine 2 does not necessarily hold, depending on the desired visual appearance.

Some embodiments may include a tandem engine configuration in which an image is transferred from the photoreceptors to the substrate one color at a time. The tandem engine may contain any number of color stations. For example, the tandem engine may contain YMCK, YMCK5, YMCK56, etc. in Print Engine 1, and additional colors in Print Engine 2.

Some embodiments may include a cyclic engine configuration in which an image is transferred from the photoreceptor to an intermediate belt or drum, and in a cyclic mode, the full set of colors in the print engine is built up on the intermediate belt or drum, one image transfer for each cycle. The full image is then transferred from the intermediate belt or drum to the substrate in a single transfer step. The cyclic engine may contain any number of color stations. For example, the cyclic engine may contain YMCK, YMCK5, YMCK56, etc in Print Engine 1, and additional colors in Print Engine 2. As discussed above, the color ordering may be flexible. For example, colors 5678 could be disposed in Print Engine 1, and the MYCK colors may be disposed in Print Engine 2; or, some of the additional colors may be disposed in Print Engine 1, and some of the MYCK colors may be disposed in Print Engine 2.

Some embodiments may include a cyclic engine configuration in which an image is transferred from the photoreceptor to the substrate, one color at a time, and in a cyclic mode, the full set of colors is built up on the substrate. The cyclic engine may contain any number of color stations. For example, the cyclic engine may contain YMCK, YMCK5, YMCK56, etc. in Print Engine 1, and additional colors in Print Engine 2. As discussed above, the color ordering may be flexible. For example, colors 5678 could be disposed in Print Engine 1, and the YMCK colors may be disposed in Print Engine 2; or, some of the additional colors may be disposed in Print Engine 1, and some of the YMCK colors may be disposed in Print Engine 2.

Although the above embodiments only describe Image-on-Image, Tandem and cyclic engine configuration for the multiple print engines, it is envisioned that any number of known or future developed systems, in any combination, may be implemented without departing from the scope of this invention. For Example, Print Engine 1 may implement an Image-on-Image process and Print Engine 2 may implement a Tandem process$_{[u1]}$.

Embodiments may include printing to either web feed or sheet feed systems, may include simplex or duplex printing systems, and may also be directed to control systems for controlling multiple Print Engines.

Embodiments may be directed to computer executable programs that are stored on a computer readable medium, including, but not limited to, a hard drive or RAM. The computer executable programs may be used to control the multiple print engines of the various above-identified embodiments.

BRIEF DESCRIPTION OF THE DRAWINGS

FIGS. 4A-4F illustrate an example of reverse printed color order for some embodiments corresponding to Image-on-Image printing with two Print Engines.

FIGS. 5A-5F illustrate a second example of reverse printed color order for some embodiments corresponding to Image-on-Image printing with two Print Engines.

EMBODIMENTS

Figure 1:
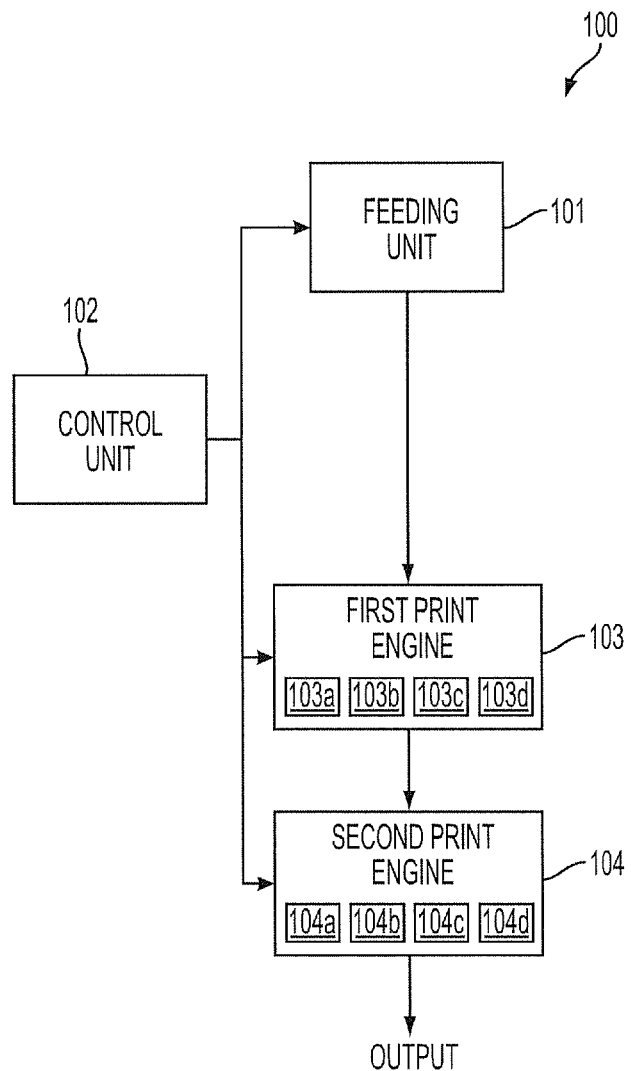
FIG. 1 illustrates an example of a printing apparatus in an exemplary embodiment.
Figure 2A:
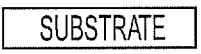
FIGS. 2A-2F illustrate an example of surface printed color order for some embodiments corresponding to Image-on-Image printing with two Print Engines in an exemplary embodiment.
Figure 2B:
Figure 2C:
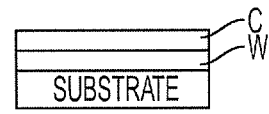
Figure 2D:
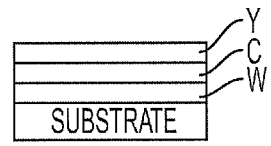
Figure 2E:
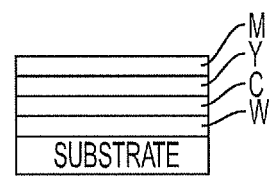
Figure 2F:
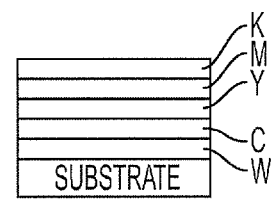
Figure 3A:
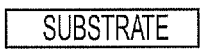
FIGS. 3A-3I illustrate a second example of surface printed color order for some embodiments corresponding to Image-on-Image printing with two Print Engines.
Figure 3B:
Figure 3C:
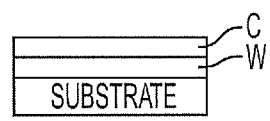
Figure 3D:
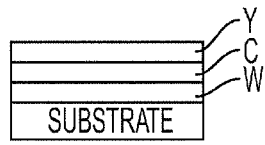
Figure 3E:
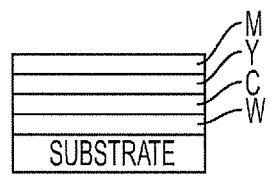
Figure 3F:
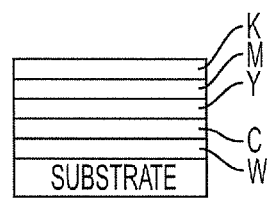
Figure 3G:
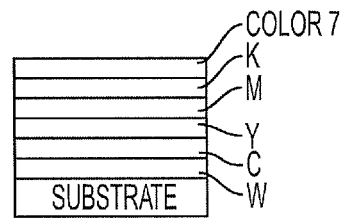
Figure 3H:
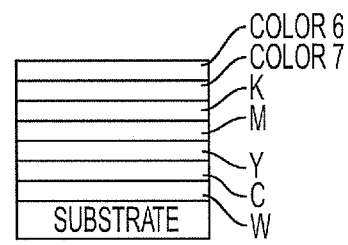
Figure 3I:
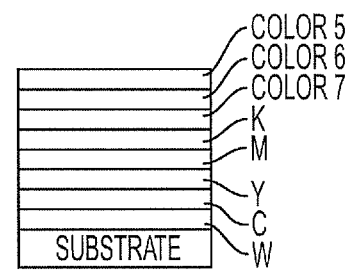
Figure 4D:
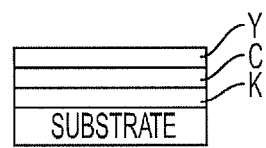
Figure 4E:
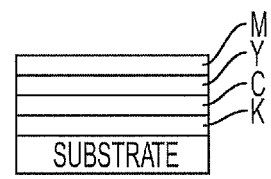
Figure 4F:
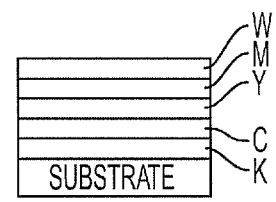
Figure 5D:
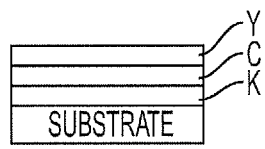
Figure 5E:
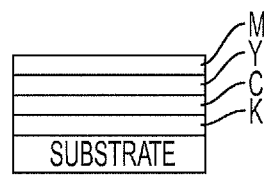
Figure 5F:
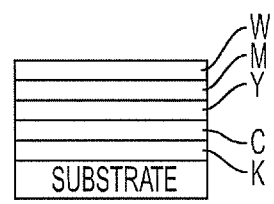
Figure 6A:
FIGS. 6A-6M illustrate an example of surface printed color order for some embodiments including two tandem Print Engines.
Figure 6B:
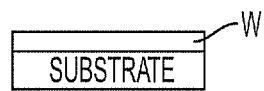
Figure 6C:
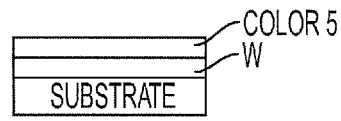
Figure 6D:
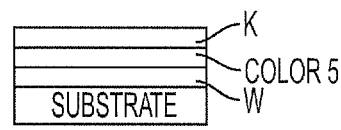
Figure 6E:
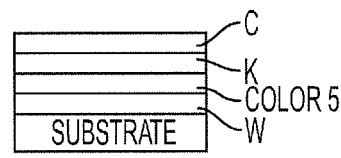
Figure 6F:
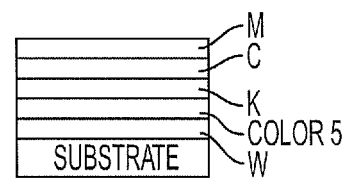
Figure 6G:
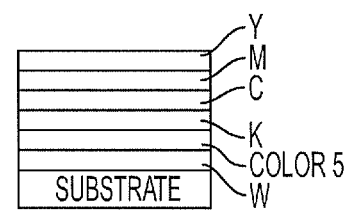
Figure 6H:
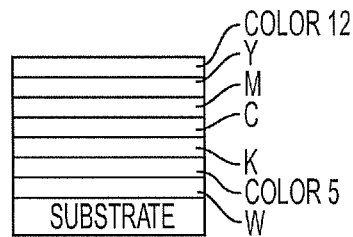
Figure 6I:
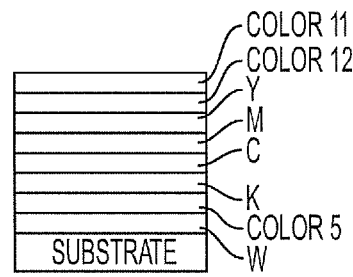
Figure 6J:
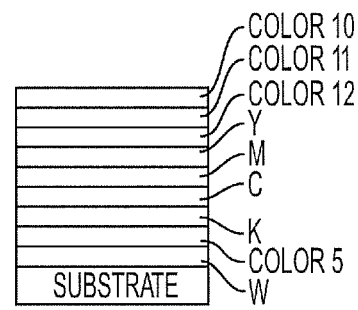
Figure 6K:
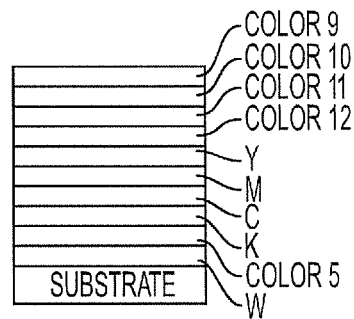
Figure 6L:
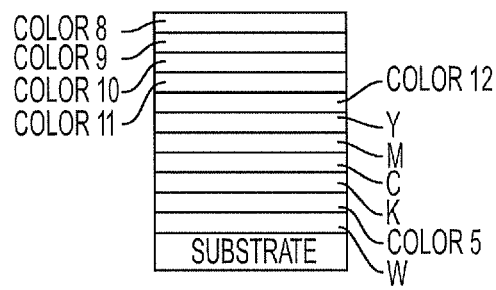
Figure 6M:
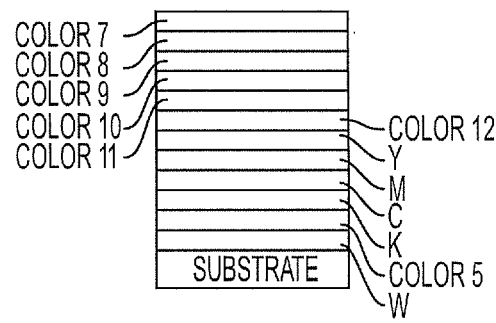
Figure 7A:
FIGS. 7A-7M illustrate an example of reverse printed color order for some embodiments including two tandem Print Engines.
Figure 7B:
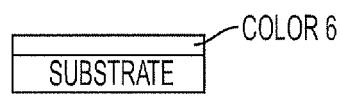
Figure 7C:
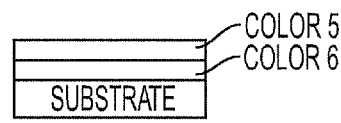
Figure 7D:
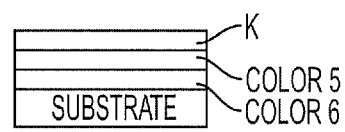
Figure 7E:
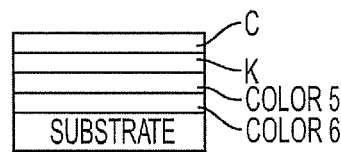
Figure 7F:
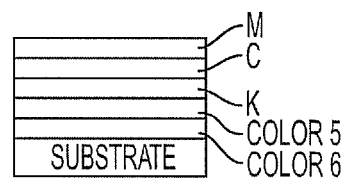
Figure 7G:
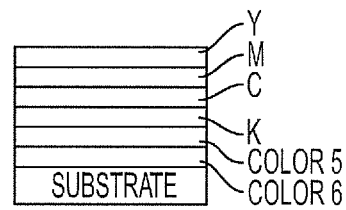
Figure 7H:
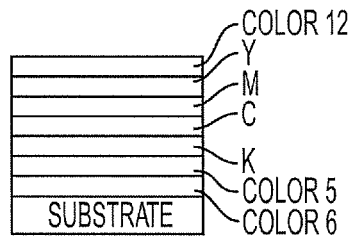
Figure 7I:
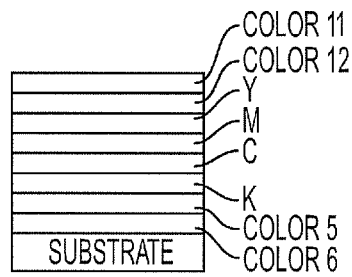
Figure 7J:
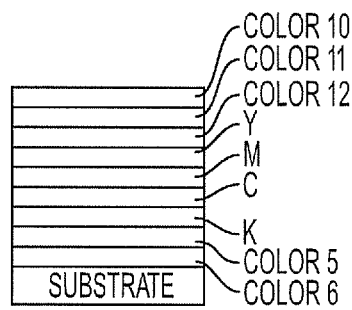
Figure 7K:
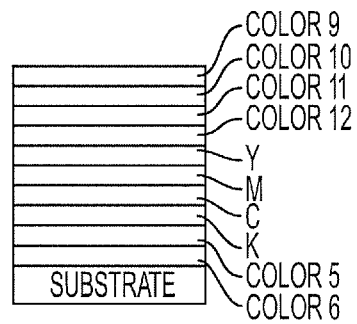
Figure 7L:
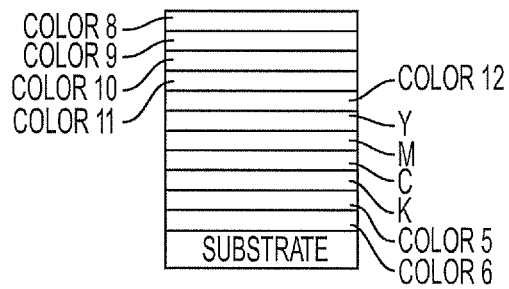
Figure 7M:
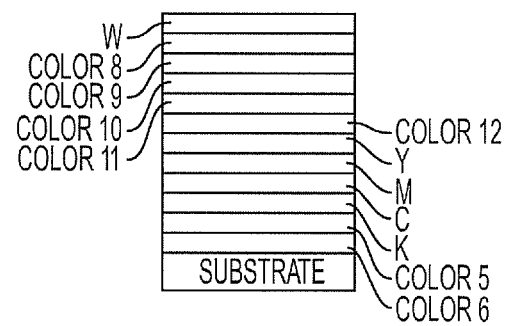

FIG. 1 illustrates an example of a printing system 100 in an exemplary embodiment. Specifically, the printing system 100 includes a substrate feeding unit 101. The feeding unit may be an unwinder in those embodiments corresponding to web printing systems. The substrate is then fed into Print Engine 1 103 that forms images corresponding to the CMYK colors. After the Print Engine 1 103 images the substrate, the substrate is fed into the Print Engine 2 104 which forms images corresponding to additional colors 5678. After the images corresponding to additional colors 5678 are formed, the full image is fixed onto the substrate. A control unit 102 may control each of the feeding unit 101, Print Engine 1 103, Print Engine 2 104.

In addition to the control described above, the control unit 102 controls the operation of other components of the printing system 100 as necessary, performs any necessary calculations and executes any necessary programs for implementing the processes of the printing system 100 and its individual components, and controls the flow of data between other components of the printing system 100 as needed.

FIGS. 2A-2F illustrate an example of surface printed color order for some embodiments corresponding to Image-on-Image printing with two Print Engines. The colors associated with Print Engine 1 are CMYW, and the colors associated with Print Engine 2 are Kxxx, where x represents an inactive color station in this example. Thus, FIGS. 2A-2F illustrates the printing on the substrate with W (e.g., white) being deposited on the substrate first, C (e.g., cyan) being deposited on the substrate second, Y (e.g., yellow) being deposited on the substrate third, M (e.g., magenta) being deposited on the substrate fourth, and K (e.g., black) being deposited on the substrate fifth. In accordance with an exemplary embodiment, one transfer to the substrate may be accomplished for each Print Engine in Image-on-Image printing. While the different colors may be transferred to the substrate in the above exemplary order, the transfer to the substrate need not be by one color at a time. FIGS. 2A-2F merely show one exemplary embodiment of an order of color transferred to a substrate, not necessarily one color at a time.

FIGS. 3A-3I illustrate a second example of surface printed color order for some embodiments corresponding to Image-on-Image printing with two Print Engines. The colors associated with Print Engine 1 are MYCW, and the colors associated with Print Engine 2 are 567K (where 5 corresponds to additional color 5; 6 corresponds to additional color 6; 7 corresponds to additional color 7; and K corresponds to black). FIGS. 3A-3I illustrates color stacking on the substrate—8 colors may be stacked on the substrate. FIGS. 3A-3I are illustrative of the color deposition order. Not every color may overlap another, particularly with respect to colors 567 which may be spot colors. Spot colors may overlap in trapped edges where two or more colors are butted together. Thus, as shown in FIGS. 3A-3I, W (e.g., white) is deposited on the substrate first; C (e.g., cyan) is deposited on the substrate second; Y (e.g., yellow) is deposited on the substrate third; M (e.g., magenta) is deposited on the substrate fourth; K (e.g., black) is deposited on the substrate fifth; 7 (e.g., additional color 7) is deposited on the substrate sixth; 6 (e.g., additional color 6) is deposited on the substrate seventh; and 5 (e.g., additional color 5) is deposited on the substrate eighth. In accordance with the exemplary embodiments, the above described color order shown in FIGS. 3A-3I is exemplary, and describes colors closest to the substrate. In an exemplary embodiment, the color order may or may not be sequential, that is, transfer to the substrate need not be by one color at a time.

FIGS. 4A-4F illustrate an example of reverse printed color order for some embodiments corresponding to Image-on-Image printing with two Print Engines. FIGS. 4A-4F further illustrate color stacking on the substrate for such embodiments. In this example, the colors associated with Print Engine 1 include CMYK, and the colors associated with Print Engine 2 include Wxxx, where W represents white and x represents inactive color stations. Thus, as illustrated in FIGS. 4A-4F, K (e.g., black) is deposited on the substrate first; C (e.g., cyan) is deposited on the substrate second; Y (e.g., yellow) is deposited on the substrate third; M (e.g., magenta) is deposited on the substrate fourth; and W (e.g., white) is deposited on the substrate fifth. As similarly discussed above, the above-described color order shown in FIGS. 4A-4F is exemplary, and describes colors closest to the substrate. In an exemplary embodiment, the color order may or may not be sequential, that is, transfer to the substrate need not be by one color at a time.

FIGS. 5A-5F illustrate a second example of reverse printed color order for some embodiments corresponding to Image-on-Image printing with two Print Engines. FIGS. 5A-5F further illustrate color stacking on the substrate. In this example, the colors associated with Print Engine 1 include MYCK, and the colors associated with Print Engine 2 include xxxW, where x represents an inactive color station and W represents white. Thus, as illustrated in FIGS. 5A-5F, K (e.g., black) is deposited on the substrate first; C (e.g., cyan) is deposited on the substrate second; Y (e.g., yellow) is deposited on the substrate third; M (e.g., magenta) is deposited on the substrate fourth; and W (e.g., white) is deposited on the substrate fifth. The described color order shown in FIGS. 5A-5F is exemplary; the color order may or may not be sequential, that is, transfer to the substrate need not be by one color at a time.

FIGS. 6A-6M illustrate an example of surface printed color order for some embodiments including two tandem Print Engines. FIGS. 6A-6M further illustrate color stacking on the substrate. Although FIGS. 6A-6M illustrates 12 colors stacked on the substrate, FIGS. 6A-6M are intended to be merely illustrative of the order in which colors are imaged onto the substrate. Because colors 7-12 may be spot colors, those colors will not necessarily be stacked. However, the spot colors may be stacked in trapped edges where two or more colors are butted together. In this example, the colors associated with Print Engine 1 include YMCK5W, and the colors associated with Print Engine 2 include 789 10 11 12. As illustrated in FIGS. 6A-6M, W (e.g., white) is deposited on the substrate first; 5 (e.g., additional color 5) is deposited on the substrate second; K (e.g., black) is deposited on the substrate third; C (e.g., cyan) is deposited on the substrate fourth; M (e.g., magenta) is deposited on the substrate fifth; Y (e.g., yellow) is deposited on the substrate sixth; 12 (e.g., additional color 12) is deposited on the substrate seventh; 11 (e.g., additional color 11) is deposited on the substrate eighth; 10 (e.g., additional color 10) is deposited on the substrate ninth; 9 (e.g., additional color 9) is deposited on the substrate tenth; 8 (e.g., additional color 8) is deposited on the substrate eleventh; and 7 (e.g., additional color 7) is deposited on the substrate twelfth.

In accordance with an exemplary embodiment, one transfer to the substrate may be accomplished for each Print Engine in Tandem printing. While the different colors may be transferred to the substrate in the above exemplary order, the transfer to the substrate need not be by one color at a time. FIGS. 6A-6M merely show one exemplary embodiment of an order of color transferred to a substrate, not necessarily one color at a time.

FIGS. 7A-7M illustrate an example of reverse printed color order for some embodiments including two tandem Print Engines. FIGS. 7A-7M further illustrate color stacking on the substrate. Although FIGS. 7A-7M illustrates 12 colors stacked on the substrate, FIGS. 7A-7M are intended to be merely illustrative of the order in which colors are imaged onto the substrate. Because colors 7-12 may be spot colors, those colors will not necessarily be stacked. The spot colors may be stacked, however, in trapped edges where two or more colors are butted together. In this example, the colors associated with Print Engine 1 include YMCK56, and the colors associated with Print Engine 2 include W89 10 11 12. As illustrated in FIGS. 7A-7M, 6 (e.g., additional color 6) will be deposited on the substrate first; 5 (e.g., additional color 5) will be deposited on the substrate second; K (e.g., black) will be deposited on the substrate third; C (e.g., cyan) will deposited on the substrate fourth; M (e.g., magenta) will be deposited on the substrate fifth; Y (e.g., yellow) will be deposited on the substrate sixth; 12 (e.g., additional color 12) will be deposited on the substrate seventh; 11 (e.g., additional color 11) will be deposited on the substrate eighth; 10 (e.g., additional color 10) will be deposited on the substrate ninth; 9 (e.g., additional color 9) will be deposited on the substrate tenth; 8 (e.g., additional color 8) will be deposited on the substrate eleventh; and W (e.g., white) will be deposited on the substrate twelfth.

The exemplary embodiments for reverse printed color order including two tandem Print Engines are not limited to the exemplary embodiment of FIGS. 7A-7M. For example, in another exemplary embodiment of reverse printed color order including two tandem Print Engines, colors associated with Print Engine 1 may include YMCK5W, and the colors associated with Print Engine 2 may include W89 10 11 12. It should be understood that many color variations may be used. This embodiment with white installed in two positions enables the control system to select which white station to use, based on surface or reverse printing, without operator intervention to change the position of the white station.

Furthermore, the exemplary embodiments are not limited to reverse printed color order including two tandem Print Engines. For example, an Image-on-Image process may be implemented in either Print Engine, or any other process known or later developed that may be implemented with the Print Engines.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

For example, the exemplary embodiments are not limited to print systems that implement dry toner processes, but may implement flexography, liquid toner processes, inkjet, roll coating, rotary screen printing, and any other known or later developed process that may incorporate multiple print engines for printing on different mediums including, for example, flexible packaging, labels, documents and the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A surface printing system that prints a color image on a substrate, the surface printing system comprising:
    a storage unit that at least temporarily stores image data that corresponds to a print job, the print job setting a deposit order of colors to be applied on a same side of the substrate;
    a feeding unit that feeds a substrate from a storage location;
    at least one of a fix station, a dry station, and a cure station; and
    a plurality of print engines, each print engine including more than two color stations, each color station corresponding to a single color, and each print engine, in accordance with the print job, forms a respective color image portion associated with a portion of the image data that corresponds to the single colors of the color stations of the particular print engine,
    the plurality of print engines configured in at least one of Image-on-Image, Tandem, or cyclic configurations,
    each of the respective color image portions being formed by the print engines in the deposit order.

2. The surface printing system according to claim 1, wherein the single colors of the color stations of at least one print engine comprise:
    at least one of magenta, yellow, cyan and black; and
    at least one additional color other than magenta, yellow, cyan and black.

3. The surface printing system according to claim 1, wherein:
    the single colors of the color stations of one print engine comprise magenta, yellow, cyan and black; and the single colors of the color stations of another print engine include colors other than magenta, yellow, cyan and black.

4. The surface printing system according to claim 1, wherein
the color image portion formed by one of the print engines is passed to the fix station, dry station, or cure station before the color image portion of another print engine is formed.

5. The surface printing system according to claim 1, wherein
each particular print engine forms on a respective intermediate medium the respective color image portion of the particular print engine, and the respective color image portion is transferred from the respective intermediate medium to the substrate before the color image portion of another print engine is formed.

6. The surface printing system according to claim 5, wherein
the print engines are ordered, the color stations within each print engine are ordered, and the last color station of the first print engine corresponds to white such that a white layer is formed as the first layer on the substrate when the color image portion of the first print engine is transferred from the intermediate medium to the substrate.

7. The surface printing system according to claim 1, wherein:
the print engines are ordered such that a first print engine of the plurality of print engines forms on the substrate a first multi-color image portion and at least a second print engine of the plurality of print engines subsequently forms on the substrate a second multi-color image portion;
the first print engine forms the first multi-color image portion on the substrate by forming a first inverted multi-color image portion on a first intermediate medium and transferring the first inverted multi-color image portion from the first intermediate medium to the substrate; and
the second print engine forms the second multi-color image portion on the substrate by forming a second inverted multi-color image portion on a second intermediate medium and transferring the second inverted multi-color image portion from the second intermediate medium to the substrate.

8. The surface printing system according to claim 7, wherein
the first intermediate medium comprises a photoreceptor belt or a photoreceptor drum.

9. The surface printing system according to claim 7, wherein
at least part of the second multi-color image portion overlaps at least part of the first multi-color image portion on the substrate.

10. The surface printing system according to claim 7, wherein:
the color stations within each print engine are ordered; and
the last color station of the first print engine corresponds to white such that a white layer is formed as the first layer on the substrate.

11. The surface printing system according to claim 1, wherein:
the color stations within each print engine are ordered; and
the last color station of at least one print engine corresponds to black.

12. A reverse printing system that prints a color image on a substrate, the reverse printing system comprising:
a storage unit that at least temporarily stores image data that corresponds to a print job, the print job setting a deposit order of colors to be applied on a same side of the substrate;
a feeding unit that feeds a substrate from a storage location;
at least one of a fix station, a dry station, and a cure station; and
a plurality of print engines, each print engine including more than two color stations, each color station corresponding to a single color, and each print engine, in accordance with the print job, forms a respective color image portion associated with a portion of the image data that corresponds to the single colors of the color stations of the particular print engine,
the plurality of print engines configured in at least one of Image-on-Image, Tandem, or cyclic configurations,
each of the respective color image portions being formed by the print in the deposit order.

13. The reverse printing system according to claim 12, wherein the single colors of the color stations of at least one print engine comprise:
at least one of magenta, yellow, cyan and black; and
at least one additional color other than magenta, yellow, cyan and black.

14. The reverse printing system according to claim 12, wherein:
the single colors of the color stations of one print engine comprise magenta, yellow, cyan and black; and
the single colors of the color stations of another print engine include colors other than magenta, yellow, cyan and black.

15. The reverse printing system according to claim 12, wherein
the color image portion formed by one of the print engines is passed to the fix station, dry station, or cure station before the color image portion of another print engine is formed.

16. The reverse printing system according to claim 12, wherein
the color order is such that a white layer is formed as the last layer on the substrate or furthest from the substrate.

17. The reverse printing system according to claim 12, wherein:
the color stations within each print engine are ordered; and
the last color station of at least one print engine corresponds to black.

18. The surface printing system according to claim 1, wherein each print engine sequentially forms the respective color image portion.

19. The surface printing system according to claim 1, wherein each print engine concurrently forms, with the color stations, the respective color image portion.

20. The surface printing system according to claim 1, wherein the color image portion is transferred to the substrate in a single transfer.

* * * * *